United States Patent
Mei et al.

(10) Patent No.: US 12,272,817 B2
(45) Date of Patent: Apr. 8, 2025

(54) LITHIUM-REPLENISHING MATERIAL, PREPARATION METHOD THEREOF, NEGATIVE ELECTRODE AND LITHIUM-ION BATTERY

(71) Applicant: BYD COMPANY LIMITED, Guangdong (CN)

(72) Inventors: Riguo Mei, Shenzhen (CN); Xiaoya Chang, Shenzhen (CN); Ziwen Wu, Shenzhen (CN); Yi Pan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 462 days.

(21) Appl. No.: 17/785,871
(22) PCT Filed: Nov. 11, 2020
(86) PCT No.: PCT/CN2020/128047
§ 371 (c)(1),
(2) Date: Jun. 15, 2022
(87) PCT Pub. No.: WO2021/120927
PCT Pub. Date: Jun. 24, 2021

(65) Prior Publication Data
US 2023/0023215 A1    Jan. 26, 2023

(30) Foreign Application Priority Data

Dec. 16, 2019 (CN) .......................... 201911296454.7

(51) Int. Cl.
*H01M 10/0525* (2010.01)
*H01M 4/04* (2006.01)
(Continued)

(52) U.S. Cl.
CPC ......... *H01M 4/382* (2013.01); *H01M 4/0404* (2013.01); *H01M 4/625* (2013.01);
(Continued)

(58) Field of Classification Search
CPC .......................... H01M 10/0525; H01M 4/625
See application file for complete search history.

(56) References Cited

U.S. PATENT DOCUMENTS 5,567,474 A     10/1996  Dover et al.
2014/0295293 A1* 10/2014  Nikawa ................ H01M 4/139
                                                       429/405
2018/0351198 A1* 12/2018  Zhamu ................. H01M 4/625

FOREIGN PATENT DOCUMENTS

CN     102601376 A     7/2012
CN     102642024 A     8/2012
(Continued)

OTHER PUBLICATIONS

Wang et al., "Electrical Conductivity of Carbon Nanotube- and Graphene-Based Nanocomposites," Chapter 4, Micromechanics and Nanomechanics of Composite Solids, May 2018, pp. 123-156.
(Continued)

*Primary Examiner* — Kevin E Yoon

(57) ABSTRACT

The present disclosure relates to a lithium-replenishing material, a preparation method thereof, and a lithium-ion battery. The lithium-replenishing material comprises metal lithium particles and conductive material, and the conductive material includes a built-in segment embedded in metal lithium particles and an exposed segment external to metal lithium particles; the electrical conductivity of the conductive material is greater than 100 s/cm. The lithium-replenishing material of the present disclosure can accomplish the electron conduction between the metal lithium particles and the anode active material through the conductive material, which increases the channel of electron conduction, and at the same time facilitates the transport of lithium ions, and improves the efficiency of lithium-replenishing significantly by rapid intercalation process of lithium ions, thereby resulting in inhibiting the formation of isolated lithium effectively and avoiding the formation of dendrites piercing the battery separator and causing potential safety hazards.

11 Claims, 1 Drawing Sheet

(51) Int. Cl.
*H01M 4/38* (2006.01)
*H01M 4/62* (2006.01)
*H01M 4/02* (2006.01)

(52) U.S. Cl.
CPC .. *H01M 10/0525* (2013.01); *H01M 2004/021* (2013.01); *H01M 2004/027* (2013.01)

(56) References Cited

FOREIGN PATENT DOCUMENTS

| | | | |
|---|---|---|---|
| CN | 105374991 A | 3/2016 | |
| CN | 106410120 A | 2/2017 | |
| CN | 106711456 A | 5/2017 | |
| CN | 106848270 A | 6/2017 | |
| CN | 107305941 A | 10/2017 | |
| CN | 107644990 A | 1/2018 | |
| CN | 108565396 A | 9/2018 | |
| CN | 109273704 A | 1/2019 | |
| CN | 109309194 A | 2/2019 | |
| CN | 109309201 A | 2/2019 | |
| CN | 109686921 A * | 4/2019 | ........ H01M 10/0525 |
| CN | 109713227 A | 5/2019 | |
| CN | 109755502 A | 5/2019 | |
| CN | 106684342 B | 8/2019 | |
| CN | 110190257 A | 8/2019 | |
| KR | 2019-0017417 A | 2/2019 | |

OTHER PUBLICATIONS

International Search Report and Written Opinion for Application No. PCT/CN2020/128047, mailed on Feb. 19, 2021, 10 pages.

\* cited by examiner

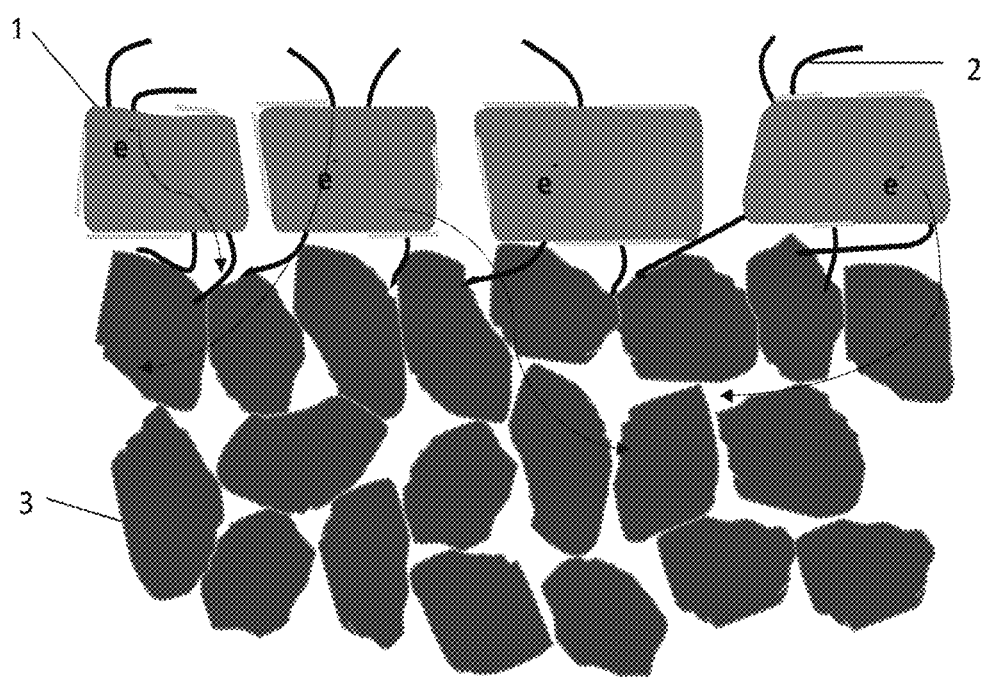

LITHIUM-REPLENISHING MATERIAL, PREPARATION METHOD THEREOF, NEGATIVE ELECTRODE AND LITHIUM-ION BATTERY

CROSS-REFERENCE TO RELATED APPLICATIONS

This application is a National Phase Application of International Patent Application No. PCT/CN2020/128047, filed on Nov. 11, 2020, which is based on and claims priority to and benefits of Chinese Patent Application No. 201911296454.7, titled "Lithium Compensation Material and Preparation Method thereof, and Negative electrode and Lithium-Ion Battery", filed with the China National Intellectual Property Administration on Dec. 16, 2019. The entire content of all of above-identified applications is incorporated herein by reference.

FIELD

The present disclosure relates to the field of lithium-ion batteries, and in particular, to a lithium-replenishing material, a preparation method thereof, a negative electrode and a lithium-ion battery.

BACKGROUND

Lithium-ion batteries have the advantages of high specific energy and long cycle life, and have been widely used in notebook computers, mobile phones and other portable electronic devices. With the increasingly severe energy and environmental problems, countries set higher request for energy saving and emission reduction. Traditional fuel vehicles not only consume petroleum, which is a fossil energy with limited reserves, but also have serious exhaust pollution. Therefore, the electric vehicles come into being as the times require. As the main energy storage unit of electric vehicles, lithium-ion power batteries have attracted more and more attention and shown good prospects for development. With the continuous increase of people's requirements for improvement of the mile range and driving experience, it is particularly important to improve the energy density of power batteries, which can be achieved by optimizing the battery structure, using electrode materials with higher capacity, and expanding the working voltage of the battery.

During the initial charging process of the lithium-ion batteries, the organic electrolyte is reduced and decomposed on the surface of the negative electrode such as graphite, forming a solid electrolyte phase interface (SEI) film, which permanently consumes the lithium ions deintercalated from the positive electrode, causing irreversible capacity loss and reducing the initial charge-discharge Coulombic efficiency and energy density. For traditional negative electrode material like graphite, the theoretical specific capacity is 372 mAh/g, and the initial irreversible capacity loss is 5%-10%. For high-capacity negative electrode materials, such as silicon and alloys, the first irreversible capacity is higher. To solve this problem, a prelithiation technology has been proposed by the researchers. The lithium ions consumed by forming the SEI film are offset by prelithiation to increase the overall capacity of the battery.

Existing prelithiation technologies can be roughly sorted into negative electrode lithium-replenishing, positive electrode lithium-replenishing, diaphragm lithium-replenishing, and electrolyte lithium-replenishing. Common negative electrode lithium-replenishing includes lithium foil replenishing and lithium powders replenishing. The potential of metal lithium is the lowest among all electrode materials. Due to the existence of the potential difference, when the negative electrode material comes into contact with the metal lithium foil or lithium powders, the electrons will spontaneously move to the negative electrode, resulting in that lithium ions are inserted into the negative electrode. However, when the lithium-replenishing material is pressed or coated on the surface of the negative electrode material, since the lithium metal is not in contact with graphite, or the lithium-replenishing layer closest to the negative electrode material is consumed, isolated lithium is easily formed, which greatly reduces the efficiency of lithium-replenishing and dendrite is likely to be formed, posing a safety hazard.

SUMMARY

The present disclosure provides a lithium-replenishing material, which has high lithium-replenishing efficiency and avoids the formation of isolated lithium to cause dendrites.

In order to achieve the above object, the present disclosure provides a lithium-replenishing material. The lithium-replenishing material includes metal lithium particles and a conductive material, and the conductive material includes a built-in segment embedded in the metal lithium particles and an exposed segment external to the metal lithium particles. The electrical conductivity of the conductive material is greater than 100 s/cm.

In an embodiment, the conductive material is a carbon material. The carbon material is selected from at least one of carbon nanotubes, carbon fibers and graphene.

In an embodiment, the carbon material is carbon nanotubes. The carbon nanotubes are single-walled carbon nanotubes and/or multi-walled carbon nanotubes, preferably multi-walled carbon nanotubes. The diameter of the carbon nanotubes is 5 nm-100 nm, preferably 10 nm-30 nm. The length of the carbon nanotube is 10 μm-80 μm, preferably 30 μm-50 μm.

In an embodiment, the content of the conductive material is 0.1-3 parts by weight, preferably 0.5-1 parts by weight, relative to 100 parts by weight of the metal lithium particles.

In an embodiment, the average particle size of the metal lithium particles is 20 μm-40 m; and/or,
a passivation layer is disposed on surfaces of the metal lithium particles. The passivation layer is of a thickness ranging from 5 nm to 100 nm. The passivation layer contains at least one of lithium carbonate, lithium fluoride and paraffin.

A method for preparing a lithium-replenishing material is provided in a second aspect of the present disclosure. The method includes the steps as follows:

S1, a first dispersion containing a molten metal lithium is mixed with a second dispersion containing a conductive material under a temperature at which the metal lithium is molten. A mixed mass is obtained after sufficiently stirring. The electrical conductivity of the conductive material is greater than 100 s/cm.

S2, the mixed mass is cooled until the metal lithium solidifies. A solid-liquid separation is performed to obtain the lithium-replenishing material.

In an embodiment, in the step S1, the conductive material is a carbon material. The carbon material is selected from at least one of carbon nanotubes, carbon fibers and graphene. Preferably, the carbon material is single-walled carbon nanotubes and/or multi-walled carbon nanotubes, preferably multi-walled carbon nanotubes. The diameter of the carbon nanotube is 5 nm-100 nm, preferably 10 nm-30 nm. The length of the carbon nanotube is 10 μm-80 μm, preferably 30 μm-50 μm.

The first dispersion further includes a surfactant. The surfactant is selected from at least one of polyvinylpyrrolidone, sodium dodecylbenzenesulfonate and cetyltrimethylammonium bromide, preferably polyvinylpyrrolidone. The weight ratio between the metal lithium and the surfactant is 1:(0.002-0.05), preferably 1:(0.005-0.02).

The dispersion medium of the first dispersion and the second dispersion is an inert organic solvent, and the dispersion medium of the first dispersion and the second dispersion is each independently selected from at least one of a hydrocarbon, an ester, an ether, and a silicone oil.

The volume ratio of the first dispersion to the second dispersion is 1:(0.1-10), preferably 1:(0.5-3). The weight ratio of the metal lithium to the conductive material is 100:(0.1-3), preferably 100:(0.5-1).

In an embodiment, the method further includes introducing carbon dioxide after the first dispersion is mixed with the second dispersion in the step S1.

A third aspect of the present disclosure provides a lithium-replenishing material prepared by the method provided in the second aspect of the present disclosure.

A fourth aspect of the present disclosure provides the negative electrode of a lithium-ion battery, the negative electrode includes a current collector, a negative electrode active material, and a lithium-replenishing material, and the lithium-replenishing material is described in any one of the first aspect of the present disclosure and the third aspect of the present disclosure.

A fifth aspect of the present disclosure provides a lithium-ion battery, the lithium-ion battery includes the negative electrode provided in the fourth aspect of the present disclosure.

With the technical solution above, electron conduction between the lithium metal particles and the negative electrode active material is realized in the lithium-replenishing material of the present disclosure via the conductive material, thereby increasing the passage of electron conduction while facilitating the transport of lithium ions, enabling a fast intercalation process of lithium ions, leading to a significant increase in the efficiency of lithium replenishment, effectively suppressing the formation of isolated lithium and avoiding the formation of dendrites piercing the separator and creating a safety hazard.

Other features and advantages of the present disclosure will be described in detail in the detailed description that follows.

BRIEF DESCRIPTION OF DRAWINGS

The accompanying drawings are used to provide a further understanding of the present disclosure, and constitute a part of the specification, and together with the following detailed description, serve to explain the present disclosure, but not to limit the present disclosure.

The FIGURE is a schematic diagram of the principle of lithium replenishment when the lithium-replenishing material of the present disclosure is applied to the negative electrode of a lithium-ion battery.

DESCRIPTION OF REFERENCE NUMBERS

1 Metal lithium particles
2 Conductive material
3 Negative electrode active material

DETAILED DESCRIPTION

The specific embodiments of the present disclosure will be described in detail below with reference to the accompanying drawings. It should be understood that the specific embodiments described herein are only used to illustrate and explain the present disclosure, but not to limit the present disclosure.

A first aspect of the present disclosure provides a lithium-replenishing material, the lithium-replenishing material comprises metal lithium particles and a conductive material, and the conductive material includes a built-in segment embedded in the metal lithium particles and an exposed segment external to the metal lithium particles. The electrical conductivity of the conductive material is greater than 100 s/cm. In a specific embodiment, the conductive material may be a one-dimensional material and/or a two-dimensional material with an electrical conductivity greater than 100 s/cm.

According to the present disclosure, the conductive material includes a built-in segment embedded in metal lithium particles and an exposed segment external to metal lithium particles, which may be implemented in various ways. For example, the conductive material may be crossed through the metal lithium particle. In one embodiment, the length of the conductive material is relatively long, and when the length of the conductive material is larger than the particle size of the lithium metal particles, the conductive material may penetrate one or even several of the lithium metal particles. Under this condition, the conductive material includes a plurality of built-in segments embedded in the metal lithium particles and a plurality of exposed segments external to the metal lithium particles, and the conductive material can be bent. In another embodiment, the length of the conductive material is short, and when it is smaller than the particle size of the metal lithium particles, the conductive material may be only partially embedded in the metal lithium particles. Under this condition, the conductive material includes only a built-in segment embedded in the metal lithium particles and an exposed segment external to the metal lithium particles. The number of the built-in segments embedded in the metal lithium particles of the conductive material is not particularly limited.

The inventors of the present disclosure found that when the conductive material in the lithium-replenishing material is partially embedded in the metal lithium particles, the conductive material can be tightly connected with the negative electrode active material by rolling the lithium-replenishing material with the negative electrode sheet that has not been supplemented with lithium, to form a vertical three-dimensional conductive network. This can not only realize the electron conduction of the solid phase interface between the metal lithium particles and the negative electrode material, but also realize the electron conduction between the inside of the metal lithium particles and the negative electrode active material through the conductive material, to increase the electron conduction channels. Meanwhile, it is helpful for the transmission of lithium ions, realizing the rapid intercalation process of lithium ions, and significantly improving the efficiency of lithium replenishment, thereby effectively inhibiting the formation of isolated lithium and avoiding the formation of dendrites piercing the separator and causing potential safety hazards.

According to the present disclosure, the conductive material may be a carbon material known in the art. For example, the carbon material may be selected from at least one of carbon nanotubes, carbon fibers and graphene. In an embodiment, the carbon material may be carbon nanotubes, and carbon nanotubes have a one-dimensional tubular structure through which electrons can conduct high-speed conduction, so they have excellent electrical conductivity. The metal lithium particles are large in size and are of a diameter of tens of micrometers, so that the bent and wound shape of carbon nanotubes is more conducive to intersperse to form a conductive network.

According to the present disclosure, the carbon nanotubes are known in the art, for example, the carbon nanotubes are at least one of single-walled carbon nanotubes and/or multi-walled carbon nanotubes. In order to improve the electrical conductivity, in an embodiment, the carbon nanotubes may be multi-walled carbon nanotubes. There is no special requirement on the size of the carbon nanotubes. In a specific embodiment, the diameter of the carbon nanotubes may be 5 nm-100 nm, preferably 10 nm-30 nm, and the length may be 10 μm-80 μm, preferably be 30 μm-50 μm.

According to the present disclosure, the content of the conductive material may be varied within a certain range. For optimal performance of the conductive material and providing a suitable proportion of the conductive network, the content of the conductive material may be 0.1-3 parts by weight, and in an embodiment, the content of the conductive material may be 0.5-1 parts by weight, respect to 100 parts by weight of the metal lithium particles.

According to the present disclosure, the average particle size of the metal lithium particles may vary within a wide range, for example, the average particle size may be 20 μm-40 μm. Wherein, the average particle size of the metal lithium particles may be measured by observing any 100 random metal lithium particles with scanning electron microscope and measuring their particle size values respectively. The average value of the particle size values is the average particle size of the metal lithium particles.

According to the present disclosure, in order to effectively prevent the internal metal lithium from further reacting with oxygen, carbon dioxide, or moisture, etc., in the air, a passivation layer is provided on the surface of the metal lithium particles. The passivation layer may be at least one of the lithium carbonate layer, lithium fluoride layer, or paraffin layer with chemically stability. The thickness of the passivation layer may vary in a wide range, for example, the thickness of the passivation layer may be 5-100 nm, and in an embodiment, the thickness of the passivation layer may be 10-30 nm.

A second aspect of the present disclosure provides a method for preparing a lithium-replenishing material, comprising:

S1, mixing a first dispersion containing a molten metal lithium with a second dispersion containing a conductive material under a temperature at which the metal lithium is molten, and stirring thoroughly to obtain a mixed mass, where the electrical conductivity of the conductive material is greater than 100 s/cm; and S2, cooling the mixed mass until the metal lithium solidifies, and performing solid-liquid separation.

According to the present disclosure, in step S1, the conductive material may be a carbon material known in the art, for example, the carbon material may be selected from at least one of carbon nanotubes, carbon fibers, or graphene. In an embodiment, the carbon material may be carbon nanotubes, and the carbon nanotube is of a one-dimensional tubular structure through which electrons can conduct high-speed conduction, so it has excellent electrical conductivity.

The metal lithium particles are relatively large in size and have a diameter of tens of micrometers, so that the bent and wound shape of the carbon nanotubes is more conducive to intersperse to form a conductive network.

According to the present disclosure, the carbon nanotubes are known in the art. For example, the carbon nanotubes may be at least one of single-walled carbon nanotubes and/or multi-walled carbon nanotubes. In order to improve the electrical conductivity, in an embodiment, the carbon nanotubes may be multi-walled carbon nanotubes. There is no special requirement on the size of the carbon nanotubes. In a specific embodiment, the diameter of the carbon nanotubes may be 5 nm-100 nm, preferably 10 nm-30 nm, and the length may be 10 μm-80 μm, preferably 30 μm-50 μm.

According to the present disclosure, in step S1, the first dispersion may further contain a surfactant, and the surfactant is known in the art. For example, the surfactant may be selected from one or more of polyvinylpyrrolidone, sodium dodecylbenzenesulfonate, or cetyltrimethylammonium bromide, and in an embodiment, the surfactant may be polyvinylpyrrolidone. The weight ratio of the metal lithium and the surfactant may vary within a certain range, for example, the weight ratio of the metal lithium and the surfactant may be 1:(0.002-0.05), preferably 1:(0.005-0.02).

According to the present disclosure, the dispersion medium of the first dispersion and the second dispersion is an inert organic solvent common in the art, and the dispersion medium of the first dispersion and the second dispersion may be independently selected from at least one of hydrocarbon, ester, ether, and silicone oil. For example, the dispersion medium of the first dispersion and the second dispersion may be selected from at least one of hydrocarbon oil, white oil and silicone oil commonly used in the art. In an embodiment, the dispersion medium of the first dispersion and the second dispersion may be silicone oil, such as methyl silicone oil, ethyl silicone oil, and methyl ethoxy silicone oil, which are not described in detail herein.

According to the present disclosure, the volume ratio of the first dispersion and the second dispersion may vary within a wide range, for example, the volume ratio of the first dispersion to the second dispersion may be 1:(0.1-10), preferably 1:(0.5-3). The weight ratio of the metal lithium to the conductive material may vary within a wide range, for example, the weight ratio of the metal lithium to the conductive material may be 100:(0.1-3), preferably 100:(0.5-1).

According to the present disclosure, the method may further include the step of introducing carbon dioxide to form a passivation layer. For example, in step S1, introducing carbon dioxide after mixing the first dispersion and the second dispersion. In order to obtain a uniform and dense passivation layer, in an embodiment, the gas may be high-purity carbon dioxide.

A third aspect of the present disclosure provides a lithium-replenishing material prepared by the method provided in the second aspect of the present disclosure.

A fourth aspect of the present disclosure provides a negative electrode of a lithium-ion battery. The negative electrode includes a current collector, a negative electrode active material and a lithium-replenishing material. The lithium-replenishing material is provided by the first aspect of the present disclosure and/or the third aspect of the present disclosure.

According to the present disclosure, the negative electrode current collector may be a conventional negative electrode current collector in a lithium-ion battery, such as stamped metal, metal foil, mesh metal, or foamed metal. The negative electrode active material may also include a binder, the type of which may be conventional in the art, and will not be repeated here.

The preparation method of the negative electrode of a lithium-ion battery of the present disclosure has no special requirements, and may be carried out with reference to the prior art. For example, the preparation method of the negative electrode of a lithium-ion battery of the present disclosure may include: coating and/or filling a negative electrode slurry containing a negative electrode active material and a binder on a negative electrode current collector, drying and rolling. The specific methods of operation and conditions may be conventional in the art and are not particularly limited herein.

The FIGURE is a schematic diagram of the principle of lithium replenishment when the lithium-replenishing material of the present disclosure is applied to the negative electrode of a lithium-ion battery. When a conductive material 2, such as carbon nanotubes, is partially embedded in metal lithium particles 1. The conductive material 2 can be wound through the metal lithium particles 1. After rolling, the bent and wound conductive material 2 can be closely connected with the negative electrode active material 3 to form a vertical three-dimensional conductive network, so that not only the electron conduction of the solid phase interface between the metal lithium particles 1 and the negative electrode active material 3 can be realized, but also the metal lithium particles 1 that are not in contact with the negative electrode active material 3 can transfer the electrons to the negative electrode active material 3 through the conductive material 2, so that the metal lithium particles 1 can realize the electron conduction process with the negative electrode active material 3 through the conductive material 2. At the same time, it is helpful for the transmission of lithium ions and realizes the rapid intercalation process of lithium ions, thereby effectively inhibiting the formation of isolated lithium, significantly improving the efficiency of lithium replenishment, and avoiding the formation of dendrites and causing potential safety hazards.

A fifth aspect of the present disclosure provides a lithium-ion battery, which includes the negative electrode of a lithium-ion battery provided in the fourth aspect of the present disclosure.

According to the present disclosure, the lithium-ion battery may also comprise a positive electrode, a separator and an electrolyte. The positive electrode, separator and electrolyte are not particularly limited in the present disclosure, which may be conventional types in the art. The lithium-ion battery may also be prepared by conventional methods in the art. For example, winding the positive electrode and the above-described negative electrode of the present disclosure apart by a separator may form an electrode assembly, and sealing the resulting electrode assembly and an electrolyte in a battery case may obtain the lithium-ion battery provided in the present disclosure. Methods of winding a separator between a positive electrode and a negative electrode are well known to those skilled in the art and will not be described in detail herein.

The present disclosure is further illustrated by the following examples, but the present disclosure is not limited thereby.

The properties of the raw materials used in the examples and comparative examples were as follows.

Multi-walled carbon nanotubes with an electrical conductivity greater than 150 s/cm, purchased from Jiangsu Tiannai Technology Co., Ltd.

Single-walled carbon nanotubes with an electrical conductivity greater than 150 s/cm, purchased from Jiangsu Tiannai Technology Co., Ltd.

Carbon fiber with an electrical conductivity greater than 100 s/cm, purchased from Jiangsu Tiannai Technology Co., Ltd.

Graphene with an electrical conductivity greater than 100 s/cm, purchased from Jiangsu Tiannai Technology Co., Ltd.

The rest of the raw materials without further description were all commercially available products.

Example 1

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of multi-walled carbon nanotubes with a diameter of 10 nm and a length of 50 μm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A1.

The lithium-replenishing material A1 of Example 1 included metal lithium particles, multi-walled carbon nanotubes and a passivation layer (specifically, a lithium carbonate layer). The multi-walled carbon nanotubes were partially embedded in the metal lithium particles. The multi-walled carbon nanotubes might include a built-in segment embedded in the metal lithium particles and an exposed segment external to the metal lithium particles, and the lithium carbonate layer was located on the surface of the metal lithium particles. It was found that the average particle size of the metal lithium particles was 27.8 μm, and the thickness of the lithium carbonate layer was 21 nm.

Example 2

In a dry environment of −60° C., 10 g of a metal lithium ingot was added to 25 g of dimethyl silicone oil and heated up to 200° C., 0.1 g of sodium dodecylbenzenesulfonate was added after the metal lithium ingot was completely melted, and kept being stirred until the metal lithium ingot was completely dissolved to obtain the first dispersion. 0.05 g of multi-walled carbon nanotubes with a diameter of 10 nm and a length of 50 μm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A2.

The lithium-replenishing material A2 of Example 2 included metal lithium particles, multi-walled carbon nanotubes and a passivation layer (specifically, a lithium carbonate layer). The multi-walled carbon nanotubes include a built-in segment embedded in the metal lithium particles and an exposed segment external to the metal lithium particles, and the lithium carbonate layer was located on the surface of the metal lithium particles. It was found that the average particle size of the metal lithium particles was 42.2 μm, and the thickness of the lithium carbonate layer was 27 nm.

Example 3

In a dry environment of −60° C., 10 g of a metal lithium ingot was added to 25 g of dimethyl silicone oil and heated up to 200° C., 0.1 g of cetyltrimethylammonium bromide was added after the metal lithium ingot was completely melted, and kept being stirred until the metal lithium ingot was completely dissolved to obtain the first dispersion. 0.05 g of multi-walled carbon nanotubes with a diameter of 10 nm and a length of 50 μm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A3.

The lithium-replenishing material A3 of Example 3 included metal lithium particles, multi-walled carbon nanotubes and a passivation layer (specifically, a lithium carbonate layer). The multi-walled carbon nanotubes include a built-in segment embedded in the metal lithium particles and an exposed segment external to the metal lithium particles, and the lithium carbonate layer was located on the surface of the metal lithium particles. It was found that the average particle size of the metal lithium particles was 45.4 μm, and the thickness of the lithium carbonate layer was 35 nm.

Example 4

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of multi-walled carbon nanotubes with a diameter of 20 nm and a length of 30 μm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A4.

The lithium-replenishing material A4 of Example 4 included metal lithium particles, multi-walled carbon nanotubes and a passivation layer (specifically, a lithium carbonate layer). The multi-walled carbon nanotubes include a built-in segment embedded in the metal lithium particles and an exposed segment external to the metal lithium particles, and the lithium carbonate layer was located on the surface of the metal lithium particles. It was found that the average particle size of the metal lithium particles was 26.2 μm, and the thickness of the lithium carbonate layer was 27 nm.

Example 5

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of multi-walled carbon nanotubes with a diameter of 40 nm and a length of 20 μm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A5.

The lithium-replenishing material A5 of Example 5 included metal lithium particles, multi-walled carbon nanotubes and a passivation layer (specifically, a lithium carbonate layer). The multi-walled carbon nanotubes include a built-in segment embedded in the metal lithium particles and an exposed segment external to the metal lithium particles, and the lithium carbonate layer was located on the surface of the metal lithium particles. It was found that the average particle size of the metal lithium particles was 29.2 μm, and the thickness of the lithium carbonate layer was 20 nm.

Example 6

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of multi-walled carbon nanotubes with a diameter of 60 nm and a length of 20 μm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A6.

The lithium-replenishing material A6 of Example 6 included metal lithium particles, multi-walled carbon nanotubes and a passivation layer (specifically, a lithium carbonate layer). The multi-walled carbon nanotubes include a built-in segment embedded in the metal lithium particles and an exposed segment external to the metal lithium particles, and the lithium carbonate layer was located on the surface of the metal lithium particles. It was found that the average particle size of the metal lithium particles was 39.6 μm, and the thickness of the lithium carbonate layer was 23 nm.

Example 7

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.08 g of multi-walled carbon nanotubes with a diameter of 20 nm and a length of 30 μm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A7.

The lithium-replenishing material A7 of Example 7 included metal lithium particles, multi-walled carbon nanotubes and a passivation layer (specifically, a lithium carbonate layer). The multi-walled carbon nanotubes include a built-in segment embedded in the metal lithium particles and an exposed segment external to the metal lithium particles, and the lithium carbonate layer was located on the surface of the metal lithium particles. It was found that the average particle size of the metal lithium particles was 25.0 µm, and the thickness of the lithium carbonate layer was 22 nm.

Example 8

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.1 g of multi-walled carbon nanotubes with a diameter of 20 nm and a length of 30 µm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A8.

The lithium-replenishing material A8 of Example 8 included metal lithium particles, multi-walled carbon nanotubes and a passivation layer (specifically, a lithium carbonate layer). The multi-walled carbon nanotubes include a built-in segment embedded in the metal lithium particles and an exposed segment external to the metal lithium particles, and the lithium carbonate layer was located on the surface of the metal lithium particles. It was found that the average particle size of the metal lithium particles was 26.4 µm, and the thickness of the lithium carbonate layer was 26 nm.

Example 9

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.2 g of multi-walled carbon nanotubes with a diameter of 20 nm and a length of 30 µm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A9.

The lithium-replenishing material A9 of Example 9 included metal lithium particles, multi-walled carbon nanotubes and a passivation layer (specifically, a lithium carbonate layer). The multi-walled carbon nanotubes include a built-in segment embedded in the metal lithium particles and an exposed segment external to the metal lithium particles, and the lithium carbonate layer was located on the surface of the metal lithium particles. It was found that the average particle size of the metal lithium particles was 27.6 µm, and the thickness of the lithium carbonate layer was 22 nm.

Example 10

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of single-walled carbon nanotubes with a diameter of 2 nm and a length of 30 µm were added to 25 g of silicone oil, and was stirred at 200° C. until the single-walled carbon nanotubes were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A10.

The lithium-replenishing material A10 of Example 10 included metal lithium particles, single-walled carbon nanotubes and a passivation layer (specifically, a lithium carbonate layer). The single-walled carbon nanotubes include a built-in segment embedded in the metal lithium particles and an exposed segment external to the metal lithium particles, and the lithium carbonate layer was located on the surface of the metal lithium particles. It was found that the average particle size of the metal lithium particles was 28.2 µm, and the thickness of the lithium carbonate layer was 18 nm.

Example 11

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of carbon fibers with a diameter of 180 nm and a length of 20 µm were added to 25 g of silicone oil, and was stirred at 200° C. until the carbon fibers were fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A11.

The lithium-replenishing material A11 of Example 11 included metal lithium particles, carbon fibers and a passivation layer (specifically, a lithium carbonate layer). The carbon fibers include a built-in segment embedded in the metal lithium particles and an exposed segment external to the metal lithium particles, and the lithium carbonate layer was located on the surface of the metal lithium particles. It was found that the average particle size of the metal lithium particles was 37.8 µm, and the thickness of the lithium carbonate layer was 25 nm.

Example 12

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of graphene with a thickness of 10 nm and a length of 8 μm was added to 25 g of silicone oil, and was stirred at 200° C. until the graphene was fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature to obtain lithium-replenishing material A12.

The lithium-replenishing material A12 of Example 12 included metal lithium particles, graphene and a passivation layer (specifically, a lithium carbonate layer). The graphene includes a built-in segment embedded in the metal lithium particles and an exposed segment external to the metal lithium particles, and the lithium carbonate layer was located on the surface of the metal lithium particles. It was found that the average particle size of the metal lithium particles was 41.0 μm, and the thickness of the lithium carbonate layer was 24 nm.

Example 13

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of multi-walled carbon nanotubes with a diameter of 10 nm and a length of 50 μm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, stirring and heating were stopped, and the solid product was collected and dried after cooling to room temperature to obtain lithium-replenishing material A13.

The lithium-replenishing material A13 of Example 13 included metal lithium particles and multi-walled carbon nanotubes. The multi-walled carbon nanotubes were partially embedded in the metal lithium particles and might include a built-in segment embedded in the metal lithium particles and an exposed segment external to the metal lithium particles. It was found that the average particle size of the metal lithium particles was 27.7 μm.

Example 14

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of multi-walled carbon nanotubes with a diameter of 10 nm and a length of 50 μm were added to 25 g of silicone oil, and was stirred at 200° C. until the multi-walled carbon nanotubes were fully dispersed to obtain a second dispersion. Under the condition of high-speed stirring, the second dispersion was slowly added to the first dispersion and mixed uniformly, inert gas containing fluorine gas was introduced, stirring and heating were stopped, and the solid product was collected and dried after cooling to room temperature to obtain lithium-replenishing material A14.

The lithium-replenishing material A14 of Example 14 included metal lithium particles, multi-walled carbon nanotubes and a passivation layer (specifically, a lithium fluoride layer). The multi-walled carbon nanotubes were partially embedded in the metal lithium particles and might include a built-in segment embedded in the metal lithium particles and an exposed segment external to the metal lithium particles, and the passivation layer was located on the surface of the metal lithium particles. It was found that the average particle size of the metal lithium particles was 28 μm, and the thickness of the passivation layer was 34 nm.

Comparative Example 1

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved. Under the condition of high-speed stirring, carbon dioxide gas was introduced, stirring and heating were stopped, and the solid product was collected and dried after cooling to room temperature, resulting in comparative lithium-replenishing material D1.

The lithium-replenishing material D1 included metal lithium particles and a passivation layer of lithium carbonate on the surface of the metal lithium particles, where the average particle size of the metal lithium particles was 24.8 μm, and the thickness of the lithium carbonate layer was 19 nm.

Comparative Example 2

Lithium-replenishing material D1 of Comparative Example 1 was used as a starting material, which was physically mixed with carbon nanotubes in a weight ratio of 1:0.008, in which the carbon nanotubes were multi-walled carbon nanotubes with a tube diameter of 20 nm and a length of 30 μm, resulting in comparative lithium-replenishing material D2.

The lithium-replenishing material D2 of Comparative Example 2 included the aforementioned lithium-replenishing material D1 and multi-walled carbon nanotubes, where the multi-walled carbon nanotubes were in simple physical mixing relationship with the lithium-replenishing material D1 and the multi-walled carbon nanotubes were not partially embedded into the lithium-replenishing material D1.

Comparative Example 3

In a dry environment of −60° C., 10 g of a metal lithium ingot was added to 25 g of dimethyl silicone oil and heated up to 200° C., 0.1 g of polyvinylpyrrolidone was added after the metal lithium ingot was completely melted, and kept being stirred until the metal lithium ingot was completely dissolved to obtain the first dispersion. 0.05 g of acetylene black with an electrical conductivity less than 100 s/cm was added to 25 g of silicone oil, and was stirred at 200° C. until it was fully dispersed to obtain a second dispersion. Under the condition of high-speed stirring, the second dispersion was slowly added to the first dispersion and mixed uniformly, carbon dioxide gas was introduced, stirring and heating were stopped, and the solid product was collected and dried after cooling to room temperature, resulting in comparative lithium-replenishing material D3.

TEST EXAMPLES

The lithium-replenishing materials A1 to A14 obtained in Examples 1 to 14 and lithium-replenishing materials D1, D2 and D3 obtained in Comparative Examples 1 to 3, respectively, were prepared into lithium-ion batteries by the following method.

Graphite, conductive agent and binder were mixed by weight of 96:2:2 to obtain a negative electrode slurry, which was coated on copper foils and oven dried, and were rolled to produce non-lithium-replenishing electrode sheets. The above lithium-replenishing materials were dissolved in volatile N-Methyl-2-pyrrolidone (NMP) solvent, and uniformly printed or coated on the previously described non-lithium-replenishing electrode sheets, which were rolled to the same thickness, cut and weighed as positive electrodes of the button batteries, with lithium sheet as negative electrodes to prepare button batteries AS1~AS14 and the comparative button batteries DS1~DS3.

The lithium-ion batteries obtained above were left to stand for 12 h and was subjected to a lithium-replenishing efficiency test under normal temperature conditions: a blue power test system produced by Wuhan LAND Electronic Co. Ltd, was used to constant charging to 3 V by a 0.01 C current, and an actual lithium-replenishing efficiency was calculated from the charge capacity. The test results are listed in Table 1.

TABLE 1

| Examples/ Comparative Examples | Charge Capacity (mAh) | Lithium-replenishing Efficiency (%) |
|---|---|---|
| Example 1 | 1.270 | 73.6 |
| Example 2 | 1.125 | 65.2 |
| Example 3 | 1.116 | 64.7 |
| Example 4 | 1.297 | 75.2 |
| Example 5 | 1.214 | 70.4 |
| Example 6 | 1.185 | 68.7 |
| Example 7 | 1.383 | 80.2 |
| Example 8 | 1.361 | 78.9 |
| Example 9 | 1.285 | 74.5 |
| Example 10 | 1.251 | 72.5 |
| Example 11 | 1.211 | 70.2 |
| Example 12 | 1.066 | 61.8 |
| Example 13 | 1.175 | 68.1 |
| Example 14 | 1.199 | 69.5 |
| Comparative Example 1 | 0.818 | 47.4 |
| Comparative Example 2 | 0.857 | 49.7 |
| Comparative Example 3 | 0.836 | 48.5 |

According to the data in Table 1, the lithium-replenishing materials of the examples of the present disclosure have excellent lithium-replenishing efficiency, and compared with the lithium-replenishing material without mixing with conductive materials (Comparative Example 1) and the lithium-replenishing material prepared by simply mixing conductive materials and metal lithium particles (Comparative Example 2), the charging specific capacity and the lithium-replenishing efficiency of the lithium-ion batteries containing the lithium-replenishing materials of the examples of the present disclosure are both higher. The reason may be that part of the conductive material in the lithium-supplementing material prepared by the method of the present disclosure is partially embedded in metal lithium particles, and after the lithium-replenishing material is rolled with the negative electrode sheet without lithium-replenishing, the conductive material in the lithium-replenishing material can be closely connected with the negative electrode active material to form a vertical three-dimensional conductive network, which can accomplish not only the electron conduction of the solid phase interface between the lithium metal particles and the negative electrode material, but also the electron conduction between the inside of the metal lithium particles and the negative electrode active material through the conductive material. The electron conduction channels are increased, and at the same time, it facilitates the transport of lithium ions, accomplishes the rapid intercalation process of lithium ions, and significantly improves the efficiency of lithium replenishment, thereby effectively inhibiting the formation of isolated lithium. In addition, by comparing the data of Examples 1-14 of the present disclosure and Comparative Example 3 in Table 1, it can be found that when the electrical conductivity of the conductive material in the lithium-replenishing material is too small, the electron conduction between the inside of the metal lithium particles and the negative electrode active material will be greatly reduced, resulting in reduced lithium-replenishing efficiency of the battery.

Further, by comparing the data of Example 1 and Examples 11-12 in Table 1, it can be found that when the conductive material is carbon nanotubes, the button battery has a higher charging capacity and lithium-replenishing efficiency. Comparing the data of Example 1 and Examples 4-6 in Table 1, it can be found that when the diameter of the multi-walled carbon nanotubes in the lithium-replenishing material is 10-30 nm and the length is 30-50 μm, the button battery has a higher charging capacity and lithium-replenishing efficiency. Comparing the data of Example 1 and Example 13 in Table 1, it can be found that when the lithium-replenishing material does not have a passivation layer (Example 13), a part of the active lithium is consumed because of its easily reaction with oxygen, carbon dioxide and moisture, etc., resulting in a decrease in the lithium-replenishing efficiency of the battery.

The embodiments of the present disclosure have been described in detail above with reference to the accompanying drawings. However, the present disclosure is not limited to the specific details of the above-mentioned embodiments. Within the scope of the technical concept of the present disclosure, various simple modifications can be made to the technical solutions of the present disclosure. These simple modifications all fall within the protection scope of the present disclosure.

In addition, it should be noted that each specific technical feature described in the above-mentioned specific embodiments may be combined in any suitable manner under the circumstance without contradiction. In order to avoid unnecessary repetition, various possible combinations are not described in the present disclosure.

In addition, the various embodiments of the present disclosure can also be arbitrarily combined, as long as they do not violate the spirit of the present disclosure, they should also be regarded as the contents disclosed in the present disclosure.

What is claimed is:

1. A lithium-replenishing material, comprising metal lithium particles and a conductive material, wherein
   the conductive material comprises a built-in segment embedded in the metal lithium particles and an exposed segment external to the metal lithium particles;
   an electrical conductivity of the conductive material is greater than about 100 s/cm wherein the conductive material comprises a carbon material, and the carbon material is carbon nanotubes, carbon fibers, or graphene; and the carbon nanotubes comprise single-walled carbon nanotubes and/or multi-walled carbon nanotubes, wherein a diameter of each of the carbon nanotubes is in a range of about 5 nm-100 nm inclusive; and a length of each of the carbon nanotubes is in a range of about 10 μm-80 μm inclusive.

2. The lithium-replenishing material of claim 1, wherein the diameter of each of the carbon nanotubes is in a range of about 10 nm-30 nm inclusive.

3. The lithium-replenishing material of claim 1, wherein the length of each of the carbon nanotubes is in a range of about 30 μm-50 μm inclusive.

4. The lithium-replenishing material of claim 1, wherein the carbon material is carbon nanotubes.

5. The lithium-replenishing material of claim 1, wherein the carbon nanotubes are multi-walled carbon nanotubes.

6. The lithium-replenishing material of claim 1, wherein a weight ratio of the conductive material to the metal lithium particles is about (0.1-3):100.

7. The lithium-replenishing material of claim 6, wherein the weight ratio of the conductive material to the metal lithium particles is about (0.5-1):100.

8. The lithium-replenishing material of claim 1, wherein an average particle size of the metal lithium particles is about 20 μm-40 μm inclusive.

9. The lithium-replenishing material of claim 1, wherein a passivation layer is provided on surfaces of the metal lithium particles; and the passivation layer comprises at least one of lithium carbonate, lithium fluoride, or paraffin.

10. The lithium-replenishing material of claim 9, wherein the passivation layer has a thickness ranging from about 5 nm to 100 nm inclusive.

11. A lithium-ion battery, wherein a negative electrode of the lithium-ion battery comprises a current collector, a negative electrode active material, and the lithium-replenishing material of claim 1.

* * * * *